United States Patent
De Vos et al.

[19]

[11] Patent Number: 5,805,239
[45] Date of Patent: Sep. 8, 1998

[54] PROCESSOR FOR COMPARING PICTURE ELEMENT BLOCKS (BLOCKS MATCHING PROCESSOR)

[75] Inventors: Luc De Vos; Matthias Schöbinger, both of München, Germany

[73] Assignee: Siemens Aktiengesellschaft, Munich, Germany

[21] Appl. No.: 619,637

[22] PCT Filed: Sep. 23, 1994

[86] PCT No.: PCT/DE94/01113

§ 371 Date: Mar. 27, 1996

§ 102(e) Date: Mar. 27, 1996

[87] PCT Pub. No.: WO95/09404

PCT Pub. Date: Apr. 6, 1995

[30] Foreign Application Priority Data

Sep. 30, 1993 [DE] Germany .......................... 43 33 476.8

[51] Int. Cl.[6] .............................. G06T 7/20; H04N 7/36
[52] U.S. Cl. .......................................... 348/699; 348/416
[58] Field of Search .................................... 348/699, 402, 348/407, 413, 416; H04N 7/36

[56] References Cited

U.S. PATENT DOCUMENTS 5,206,723   4/1993   Parke ....................................... 348/416

FOREIGN PATENT DOCUMENTS 0395293   10/1990   European Pat. Off. .

OTHER PUBLICATIONS

IEEE Transactions on Circuits and Systems, vol. 36, No. 10, Oct. 1989, Luc De Vos et al,Parameterizable VLSI Architectures for the Full–Search Block–Matching Algorithm, pp. 1309–1316.

*Primary Examiner*—Howard Britton
*Attorney, Agent, or Firm*—Hill & Simpson

[57] ABSTRACT

A processor is disclosed, in which a block memory (ADM), a search domain memory (SDM), a two-dimensional processor/memory cell field (PRA) and a control unit (CTRL) are preferably monolithically integrated in a semi-conductor chip. The word width of toe search domain memory (SDM) is organised so that the processor/register cell field (PRA) is supplied, in parallel per system cycle (CLK) with data (SF) on picture elements of a new complete column of the search domain. At the same time, a control sequence is stored in the control unit (CTRL). The control sequence supplies data flow control signals (DFC) and addresses (ADR1, ADR2) to the block memory and search domain memory in parallel, per system cycle. The control unit essentially consists of a shift register into which external control signals (CD) of any desired control sequences may be written. An essential advantage of the invention is that it allows a comparatively high hardware utilisation even in the case of block matching algorithms based on an incomplete search.

6 Claims, 3 Drawing Sheets

PROCESSOR FOR COMPARING PICTURE ELEMENT BLOCKS (BLOCKS MATCHING PROCESSOR)

BACKGROUND OF THE INVENTION

Processors of this type are utilized in many applications in the field of motion estimation such as, for example, in hybrid coding for video compression or in a motion-compensated interpolation. A flexible solution is thereby desirable in order to support different methods but different parameter combination as well. Examples of this include underscanning in the shift field, investigation of what are referred to as candidate vectors and calculations with sub-pixel precision.

All-purpose digital signal processors or flexible video processors are usually designed neither for the required calculating performance nor for the required I/O bandwidths.

The high calculating performance required therefor can be produced with two-dimensional cell fields. Since, however, external data can only be supplied over the cell field edge in this case, the high calculating performance that is available can usually only be incompletely exploited, considerable usage losses resulting therefrom as a rule.

Up to now, high usage factors of, for example, up to 100% of said two-dimensional cell fields were hitherto achieved only given dedicated implementations of block-matching algorithms based on a complete search.

The publication, IEEE Transactions on Circuits and Systems, Vol. 36, No. 10, October 1989, pages 1309 through 1316 explains a parameterizable VLSI architecture for a block-matching algorithm that is based on a complete search in greater detail.

Given an incomplete search, i.e. when all possible shift vectors with a respective search region are not investigated, only one sub-set of the calculated results is required. Although a block-matching algorithm based on an incomplete search can be realized by a flexible selection of the relevant results or of the processor elements to be considered in the cell field, this occurs at the expense of substantial losses in the effective usage of the processor circuit.

European Patent Application 0 395 293 A1 (corresponding to U.S. Pat. No. 5,206,723) discloses a motion estimating means with comparison processors wherein, among other things, a minimum shift vector is calculated.

SUMMARY OF THE INVENTION

The object underlying the invention is then comprised in specifying a processor for comparing picture element blocks (block matching processor) with a two-dimensional cell field that also offers an optimally high hardware usage given block matching algorithms that are based on an incomplete search.

In general terms the present invention is a processor for comparing picture element blocks (block matching processor), whereby a block memory for data of two current picture element blocks, a search domain memory for data of picture elements of a part of a comparison image limited by two horizontally neighboring search domains, a respective search domain being composed of rows and columns, a two-dimensional processor/register cell field and a control unit are provided. The search domain memory is organized with respect to its word width such that the processor/register cell field is respectively supplied in parallel with data of picture elements of a complete column of the respective search domain per system clock. An amount is formed from a respective difference and the amounts are summed up. The search domain memory contains data of two search domains. The two search domains horizontally overlap one another in order to shorten a reloading of the processor/register cell field given a change of search domain. A control sequence is stored in the control unit that, per system clock, supplies parallel data flow control signals, an address for addressing the block memory, and a further address for addressing the respective search domain memory. The control unit is programmed by external control data. A shift register clocked by the system clock is provided. A flexible control sequence dependent on the respective comparison method (block matching algorithm) is written thereinto by the control data. The control sequence generates the output signals of the control unit such that only a part (dependent on the respective comparison method) of all fundamentally possible shifts between the current picture element block and blocks of the search domain of the comparison image are compared (incomplete search).

Advantageous developments of the present invention are as follows.

The processor/register cell field is connected to and followed by a unit for determining a minimum wherein a minimum nor is calculated from amount sum norms. A unit for forming a probable shift vector is additionally provided. The probable shift vector is generated from a portion of output signals of the control unit when a respective amount sum norm corresponds to the minimum norm.

Some of the output signals are data flow control signals. The unit for forming the shift vector has a respective counter of the plurality of counters for each component of the shift vector. The counter receives counting pulses by means of the data flow control signals. The counters of the plurality of counters are respectively followed by a hold element into which the respective shift vector at the output of the counter is stored insofar as a respective amount sum norm corresponds to a respective minimum norm. A vector memory that is addressed by a part of the output signals of the control unit is provided in the unit for forming the shift vector. The unit for forming the shift vector contains a holding element for each component of the shift vector and in which the respective shift vector is stored insofar as a respective amount sum norm corresponds to a respective minimum norm.

The unit for forming the shift vector is directly supplied with a portion of the output signals of the control unit, the portion of the output signals corresponding to the respective shift vector itself. The unit for forming the shift vector contains a holding element for each component of the shift vector and in which the respective shift vector is stored insofar as a respective amount sum norm corresponds to a respective minimum norm.

The processor is monolithically integrated on a semiconductor chip.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
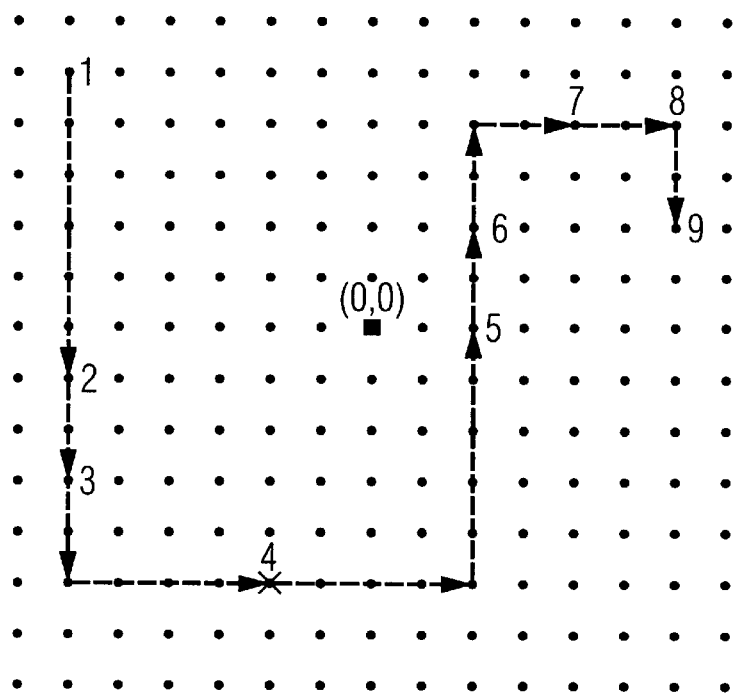
FIG. 1 is a diagram for explaining an incomplete search.

FIG. 1 shows an example of a shift field with 11*13=143 possible shifts that are shown as points and with a shift 0,0 as mid-point. Differing from the complete search, all shifts are not required for a block matching algorithm based on an incomplete search; rather, only the shifts 1–9 shown in FIG. 1 as bold-face points are required. With a conventional processor, i.e. given a complete search with subsequent selection of the required shifts, 11*13=143 calculations would be implemented here, even though, for example, only 9 of these are needed here.

With an inventive processor, by contrast, a meander-like data flow indicated in FIG. 1 with bold face, broken-line arrows is possible, whereby the plurality of required calculations can be reduced from 143 to 34. The effective usage factor of the cell field thus rises from 6% to 26%.

As explained in greater detail in IEEE Transactions on Circuits and Systems, Vol. 36, No. 10, October 1989, pages 1309 through 1316, processors having a cell field of type 1 or of type 2 are possible, whereby the cell field of type 1 effects a global accumulation and the cell field of type 2 effects a local accumulations.

The inventive processor can fundamentally comprise a cell field of type 1 or, on the other hand, a cell field of type two as well, whereby the cell field of type 1 usually offers a better hardware utilization in the case of an incomplete search.

Figure 2:
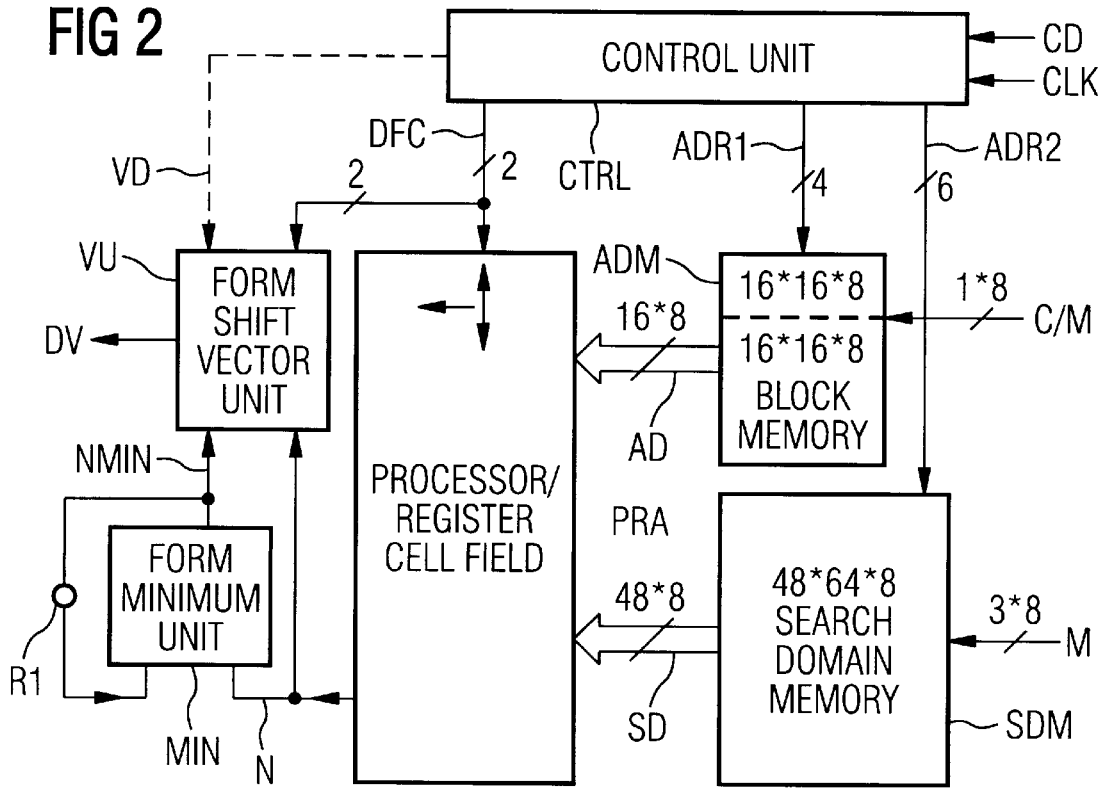
FIG. 2 is a block circuit diagram of an inventive processor with a two-dimensional cell field.

FIG. 2 shows a block circuit diagram of an inventive processor for comparing picture element blocks, this comprising a processor/register cell field PRA, a search domain memory SDM, a block memory ADM, a control unit CTRL and, potentially additionally, a unit VU for forming a probably shift vector DV and a minimum-forming unit MIN with a feedback register R1. By way of example, the word widths and memory dimensions for a current picture element block with 16*16 picture elements and a search domain of 48*48 picture elements are recited in FIG. 2. The block memory ADM for data of a current picture element block receives, for example, 8 bits for a picture element—that correspond to a gray scale value or a color value—either directly from a camera or from an external image memory per system clock CLK. The block memory ADM is composed of two identical units each of which respectively having rows and columns of 16 picture elements each like the image block, whereby 8 bits are provided per picture element. These units are employed in alternating mode for reading the data into the block memory and for reading the data out into the processor/register cell field PRA. One column with 16* 8 bits here can be read out parallel at the output of the block memory ADM per system clock as current data AD and into the processor/register cell field PRA. A complete column of the current picture element block can be read into the block memory ADM from the external image store in respectively 16 system clocks.

Since the search domain here comprises, for example, 48 rows and 48 columns and a column of the search domain memory SDM must be loaded with a column of the block memory ADM at the same time, 3*8 bits are supplied to the search domain memory SDM from an external image store M per system clock, as a result whereof a column of the search domain having 48*8 bits here can be read into the search domain memory SDM after respectively 16 system clocks. At the output of the search domain memory SDM, a column having 48*8 bits here can be read in parallel into the processor/register field PRA as search domain data. The search domain memory SDM thereby comprises an organization of 48*64*8 bits since respectively two successive search domains overlap in a region of 48*32 bits and reading is respectively undertaken from a block of 48*48 picture elements and writing is respectively undertaken in a block of 16*48 picture elements. What is thereby critical to the invention is that, once the search domain memory SDM has been completely written with data, any arbitrary shift within a respective search domain is possible within a maximum of 16 system clocks be reloading corresponding columns from the search domain memory into the processor/register field. The shifts ensue horizontally only in the direction of the cell field output and vertically both downward as well as upward.

Figure 3:
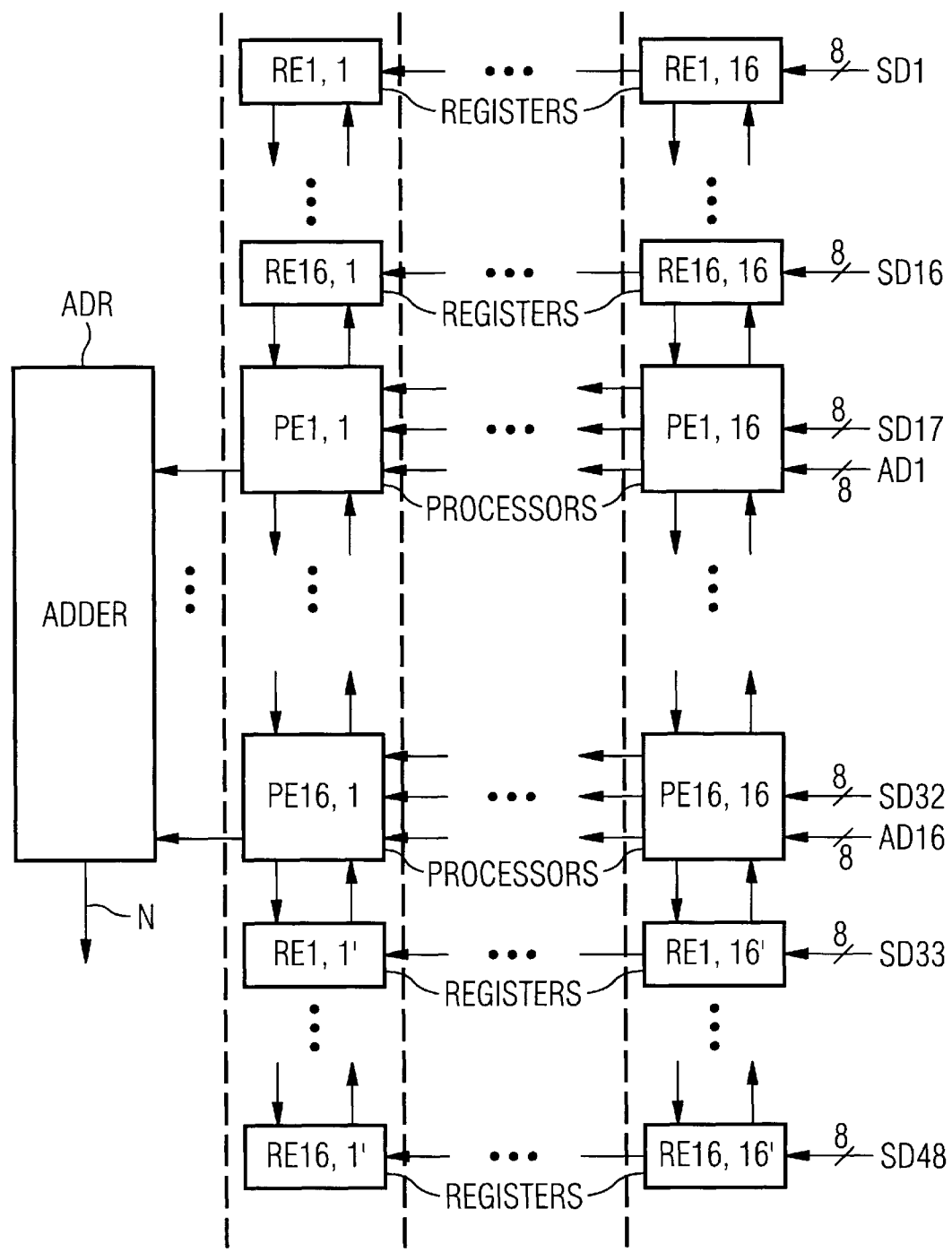
FIG. 3 is a detailed circuit diagram of a cell field contained in FIG. 2.

By way of example, FIG. 3 shows a processor/register cell field PRA for a global accumulation in detail. Advantageously, one processor unit is provided per picture element of the current picture element block, i.e. processor units PE1,1 . . . PE16,16 in the example of 16*16 picture elements. Since a search domain column comprises 48 picture elements here, each column of processor units is upwardly supplemented by 16 registers and is downwardly supplemented by 16 registers. From top to bottom, the first column of the processor/register field shown in FIG. 3 is thus composed of 16 registers RE1,1 . . . RE16,1, processor units PE1,1 . . . PE16,1, and of 16 more register units RE1,1' . . . RE16,1'. The other columns of the processor/register cell field are correspondingly organized, whereby the last column is composed of 16 register units RE1, 16 . . . RE16,16, processor units PE1,16 . . . PE16,16, and of another 16 register units 1,16' . . . RE16,16'. Output data SD1. SD16 respectively 8 bits wide are supplied parallel to the register units RE1, 16 . . . RE16,16, the respectively 8-bit wide output data SD17 . . . SD32 of the search domain memory SDM are supplied parallel to the processor units PE1,16 . . . PE16,16, and the output data SD33 . . . SD48 of the search domain memory SDM that, for example, are 8 bits wide are supplied parallel to the register units RE1,16' . . . RE16,16'. For further improvement of the usage, a means for the cyclical permutation of the supplied data is also conceivable in order to avoid pure shift operations in the processor/register field. Over and above this, the processor units PE1,16 . . . PE16,16 are respectively supplied with output data AD1 . . . AD16 of the block memory ADM that, for example, are 8 bits wide. The processor units of the sixteenth column can thereby transfer search domain data and current data for intermediate results to the fifteenth column, etc., before the intermediate results of the first column are transferred to an adder means ADD via intermediate result outputs, for example ZO.

The adder means ADD is thereby composed, for example, of a binary adder tree, i.e. 8 adders here in the first level;, 4 in the second level, 2 in the third level and 1 adder in the fourth level. The amount sum norm N is thereby formed at the adder means ADD output from differences from the data for the current picture element block and the data of picture elements of the part of the comparison image limited by the search domain.

Analogous to the processor units, the register units of the sixteenth column RE1,16 . . . RE16,16' can transfer data to register units of the fifteenth column, etc., all the way to the register units RE1,1 . . . RE16,1'. A bidirectional data transport is possible between the register units and processor units or, respectively, register units and register units, whereby data are respectively forwarded by one row during a system clock.

Figure 4:
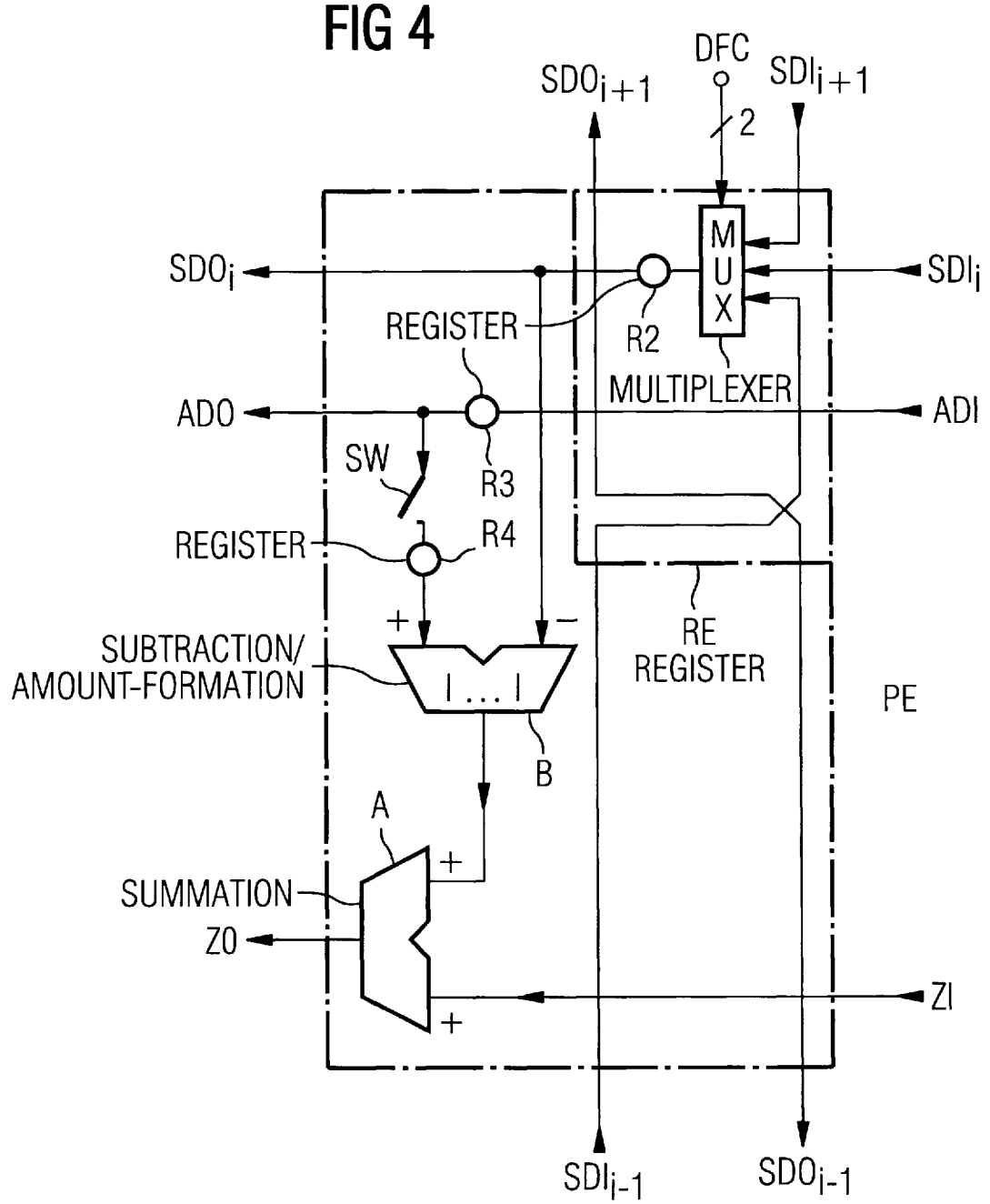
FIG. 4 is a detailed circuit diagram of a processor element contained in FIG. 3.

FIG. 4 shows a detailed circuit diagram of a processor unit PE, whereby the processor unit PE itself also contains a register unit RE. A register unit RE is composed of a multiplexer MUX and of a following register R2 whose output simultaneously supplies search domain data output signals $SDO_i$ of the register unit RE or, respectively, of the processor unit PE. Dependent on a data flow control signal DFC that is 2 bits wide, search domain data input signals $SDI_{i+1}$ and $SDI_{i-1}$ of the neighboring rows as well as a search domain data inputs signal $SDI_i$ of a neighboring column preceding in data flow direction are optionally through-connected onto the input of the register R2. The output of the register R2 supplies search domain data output signals $SDO_{i+1}$ and SDO for register units in neighboring cells as well as a search domain data output signal $SDO_i$ for a register unit of a column of the cell field that follows in data flow direction. An input signal ADI for data of a current picture element block is forwarded in the processor unit PE via a register R3 to the respective output, whereby an output signal ADO for data of a current picture element block is present at the output of the processor unit PE.

In addition to containing the register unit RE, the processor unit PE contains a switch SW, a register R4, a subtraction/amount-forming unit B and a summation unit A. During the processing of a block, the switch SW is opened and the data of a current picture element block stored in the buffer register R4 are adjacent at the plus input of the subtraction/amount-forming unit B. Only when a new block is loaded is the switch SW closed and the buffer register R4 loaded with data of a new, current picture element block. The buffer register R4 serves more for decoupling and may potentially not be required dependent on the circuit-oriented implementation of the processor unit. The minus input of the subtractor/amount-forming unit is supplied with the signal $SDO_i$, and the output of the subtraction/amount-forming unit is connected to an input of the addition unit A, whose second input is supplied with an input signal for an intermediate result of a column of the cell field that precedes in data flow direction, and the output thereof supplying an output signal ZO for a column following in data flow direction.

A processor/register cell field for a local accumulation is constructed similar to that shown in FIG. 3, whereby the critical differences are comprised therein that no intermediate results are forwarded between processor units but are further-processed in this itself and, via a further multiplexer, either the norm at the output of the adder unit A of the respective processor element or norms of processor elements preceding in data flow direction proceed as norm N to the output of the cell field PRA.

The control unit CTRL is advantageously composed of a shift register that is clocked by the system clock CLK and whose content is freely programmed by external control data CD. Alternatively to the shift register or comparably organized, other write/read memories, a control unit on the basis of a read-only memory is also fundamentally conceivable. The control unit must thereby be of such a nature that a control sequence can be stored therein that, per system clock CLK, supplies parallel data flow control signals DFC, an address ADR1 for addressing the block memory and a further address for addressing the search domain memory.

When it is not only amount sum norms N but a probable shift vector DV that are to be calculated in the processor, then the unit MIN for determining a minimum as well as, additionally, the unit VU for forming a probable shift vector DV are additionally provided in the processor. The output signal of the unit MIN is thereby returned via a register R1 onto an input of the unit MIN, and the further input of the unit MIN is supplied with the amount sum norms N of the processor/register cell field.

Dependent on the embodiment of the unit VU, the probably shift vector DV can be formed in the respective unit VU either with the assistance of the data flow control signals DFC of the control unit CTRL or, indicated with broken lines in FIG. 2, with the assistance of output signals VD of the control unit additionally stored in the control unit. The additional output signals VD can thereby be composed of vector data themselves or, on the hand, of addresses of vector data.

When only the data flow control signals DFC are utilized for forming the shift vector DV, then the unit VU contains a counter for each component of the probable shift vector DV that can receive positive or negative counting pulses by means of the data flow control signals DFC and that is respectively followed by a hold element in which the respective shift vector adjacent at the output of the counter is stored, insofar as a respective amount sum norm N corresponds to a respective minimum norm NMIN.

When the additional output signals VD of the control unit CTRL are composed of vector addresses, then it is not a counter but a vector memory that is provided in the unit VU, this vector memory being addressed by the vector addresses. Further, a hold element in which the respective component of the shift vector is stored insofar as a respective amount sum norm N corresponds to a respective norm NMIN is provided in the unit VU for each component of the shift vector.

When the additional output signal VD of the control unit is composed of the respective shift vector itself, then the respective shift vector is transferred in hold elements as probable shift vector insofar as a respective amount sum norm N corresponds to a respective minimum norm NMIN.

An advantageous development of the inventive processor derives in that the processor is monolithically integrated on a semiconductor chip together with the memories ADM and SDM.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A block matching processor for comparing picture element blocks, comprising:

a block memory for data of two current picture element blocks, a search domain memory for data of picture elements of a part of a comparison image limited by two horizontally neighboring search domains, a respective search domain being composed of rows and columns, a two-dimensional processor/register cell field connected to the block memory and to the search domain memory, and a control unit connected to the block memory, to the search domain memory, and to the processor/register cell field;

the search domain memory organized with respect to a word width thereof such that the processor/register cell field is respectively supplied in parallel with data of picture elements of a complete column of the respective search domain per system clock, a respective amount being formed from a respective difference and respective amounts being summed up;

the search domain memory having data of two search domains, the two search domains horizontally overlapping one another in order to shorten a reloading of the processor/register cell field given a change of search domain;

a control sequence stored in the control unit that, per system clock, supplies parallel data flow control signals, a first address for addressing the block memory, a second address for addressing the respective search domain in the search domain memory;

the control unit being programmed by external control data; and a shift register clocked by the system clock, a flexible control sequence dependent on a respective comparison method being written thereinto according to the control data, said control sequence generating the output signals of the control unit such that only a part which is dependent on the respective comparison method of all possible shifts between the current picture element block and blocks of the search domain of the comparison image are compared.

2. The processor according to claim 1, wherein the processor/register cell field is connected to and followed by a unit for determining a minimum wherein a minimum norm is calculated from amount sum norms;

wherein a unit for forming a probable shift vector is additionally provided;

wherein the probable shift vector is generated from a portion of output signals of the control unit when a respective amount sum norm corresponds to the minimum norm.

3. The processor according to claim 2, wherein some of the output signals are data flow control signals and wherein a plurality of counters are provided;

wherein the unit for forming the shift vector has a respective counter of the plurality of counters for each component of the shift vector, said counter receiving counting pulses by means of the data flow control signals; and the counters of the plurality of counters respectively followed by a hold element into which the respective shift vector at the output of the counter is stored insofar as a respective amount sum norm corresponds to a respective minimum norm.

4. The processor according to claim 2, wherein a vector memory that is addressed by a part of the output signals of the control unit is provided in the unit for forming the shift vector; and wherein the unit for forming the shift vector contains a holding element for each component of the shift vector and in which the respective shift vector is stored insofar as a respective amount sum norm corresponds to a respective minimum norm.

5. The processor according to claim 2, wherein the unit for forming the shift vector is directly supplied with a portion of the output signals of the control unit, the portion of the output signals corresponding to the respective shift vector itself; and wherein the unit for forming the shift vector contains a holding element for each component of the shift vector and in which the respective shift vector is stored insofar as a respective amount sum norm corresponds to a respective minimum norm.

6. The processor according to claim 1 wherein the processor is monolithically integrated on a semiconductor chip.

* * * * *